US008651871B2

(12) United States Patent
Morais

(10) Patent No.: US 8,651,871 B2
(45) Date of Patent: Feb. 18, 2014

(54) SYSTEM AND METHOD FOR PRODUCTIVITY THINKING CODE LEVEL EVALUATION

(76) Inventor: Gary A. Morais, Santa Barbara, CA (US)

( * ) Notice: Subject to any disclaimer, the term of this patent is extended or adjusted under 35 U.S.C. 154(b) by 1373 days.

(21) Appl. No.: 12/251,405

(22) Filed: Oct. 14, 2008

(65) Prior Publication Data
US 2009/0098518 A1 Apr. 16, 2009

Related U.S. Application Data

(60) Provisional application No. 60/979,776, filed on Oct. 12, 2007.

(51) Int. Cl.
G09B 19/00 (2006.01)
(52) U.S. Cl.
USPC .......................................... 434/219; 705/7.42
(58) Field of Classification Search
USPC .......................................... 434/219; 705/7.24
See application file for complete search history.

(56) References Cited

U.S. PATENT DOCUMENTS

| | | | | |
|---|---|---|---|---|
| 5,325,292 A * | 6/1994 | Crockett | ...................... | 705/7.18 |
| 5,551,880 A * | 9/1996 | Bonnstetter et al. | .......... | 434/236 |
| 5,799,286 A * | 8/1998 | Morgan et al. | .................. | 705/30 |
| 5,819,231 A * | 10/1998 | Tremaine | ...................... | 705/7.21 |
| 5,909,669 A * | 6/1999 | Havens | .......................... | 705/7.42 |
| 5,911,134 A * | 6/1999 | Castonguay et al. | ........ | 705/7.12 |
| 5,926,794 A * | 7/1999 | Fethe | .............................. | 705/7.39 |
| 6,338,042 B1* | 1/2002 | Paizis | ........................... | 705/7.37 |
| 6,594,668 B1* | 7/2003 | Hudy | ............................. | 707/758 |
| 6,615,182 B1* | 9/2003 | Powers et al. | ................. | 705/7.42 |
| 6,618,723 B1* | 9/2003 | Smith | .................................. | 1/1 |
| 6,865,581 B1* | 3/2005 | Cloninger et al. | ............ | 705/7.42 |
| 7,024,372 B2* | 4/2006 | Kobayashi | .................... | 705/7.42 |
| 7,082,404 B2* | 7/2006 | Calderaro et al. | ............ | 705/7.42 |
| 7,184,969 B1* | 2/2007 | Bonnstetter et al. | ......... | 705/7.14 |
| 7,233,971 B1* | 6/2007 | Levy | .............................. | 709/203 |
| 7,668,746 B2* | 2/2010 | Eisma et al. | ................... | 705/7.14 |
| 8,041,598 B1* | 10/2011 | Russell | ......................... | 705/7.42 |
| 2003/0036942 A1* | 2/2003 | Wescott | ............................ | 705/9 |
| 2003/0055706 A1* | 3/2003 | Statfeld | ............................. | 705/9 |
| 2003/0101118 A1* | 5/2003 | Macken et al. | .................. | 705/35 |
| 2004/0068431 A1* | 4/2004 | Smith et al. | ...................... | 705/10 |
| 2004/0193472 A1* | 9/2004 | Ramakrishnan et al. | ......... | 705/9 |
| 2005/0021384 A1* | 1/2005 | Pantaleo et al. | .................... | 705/9 |
| 2006/0015393 A1* | 1/2006 | Eisma et al. | ..................... | 705/11 |
| 2006/0100945 A1* | 5/2006 | Macy et al. | ...................... | 705/35 |

(Continued)

Primary Examiner — Robert J Utama
(74) Attorney, Agent, or Firm — Christie, Parker & Hale, LLP

(57) ABSTRACT

A system and method are provided for identifying ranges of scores in thinking areas that are indicative of individuals that perform at top levels. A position within an organization is identified. One or more individuals are identified as people that perform at a top level in that position. Each of the identified individuals is evaluated against a full time equivalent at the position. Each of the identified individuals is also scored in particular thinking areas. In some embodiments, the scores are based on the answers given by the identified individuals to a questionnaire. Characteristics of various workers are prioritized as to their desirability in a person performing the functions of the identified position. Based on the scores in particular thinking areas for the identified individuals, the full time equivalent evaluations for the identified individuals, and the prioritization of worker characteristics, a determination is made of ranges of scores in at least one of the thinking areas that are characteristic of persons who perform at top levels in the identified position.

20 Claims, 5 Drawing Sheets

(56) References Cited

U.S. PATENT DOCUMENTS

| | | |
|---|---|---|
| 2007/0015125 A1* | 1/2007 | Mobbs et al. .............. 434/219 |
| 2007/0050276 A1* | 3/2007 | Mannion .................... 705/35 |
| 2007/0162321 A1* | 7/2007 | Behrmann et al. ............ 705/9 |
| 2007/0239500 A1* | 10/2007 | Barrett et al. ............... 705/7 |
| 2007/0266054 A1* | 11/2007 | Stephens et al. ............ 707/200 |
| 2008/0046297 A1* | 2/2008 | Shafer ....................... 705/4 |
| 2008/0059291 A1* | 3/2008 | McCall ...................... 705/11 |
| 2009/0222310 A1* | 9/2009 | Vollmer et al. .............. 705/8 |
| 2009/0319344 A1 | 12/2009 | Tepper et al. |

* cited by examiner

Top Performer Template

Company:

Department:

Position:
RN

Distributed By:
GLOBAL PERFORMANCE TECHNOLOGIES

Create Date:

Report Date:

Profile Factor: 11 to 16

Performance IQ Widget
Virtual Top Performer Headhunter Dashboard

500

510

Client Name: Acme Consulting
Department: Sales
Position: Outside Sales - Regional Rep

| Candidate Name | Exam Date | Profile Graph | Custom Interview | Email | Phone | Level | Background Check |
|---|---|---|---|---|---|---|---|
| John Doe | 2/1/2008 | Click Here | Click Here | jdoe@gmail.com | (310) 555-1111 | 5 | In Progress |
| Anne Brown | 1/23/2008 | Click Here | Click Here | AnneB@yahoo.com | (310) 555-1212 | 4 | Need |
| James Stewart | 1/24/2008 | Click Here | Click Here | James.Stewart@hotmail.com | (310) 555-1313 | 4 | Complete |
| Andrew Smith | 2/15/2008 | Click Here | Click Here | Asmith@gmail.com | (310) 555-1414 | 3 | Need |
| Bob Watts | 2/12/2008 | Click Here | Click Here | Bob.Watts@hotmail.com | (310) 555-1515 | 3 | Need |
| Sarah Klein | 2/6/2008 | Click Here | Click Here | KleinS@yahoo.com | (310) 555-1616 | 2 | In Progress |

520  540  550  530

The categories are for discussion only, we may want to add columns like:
- Industry of person or their job title (entered from User data capture)
- Individual Drivers so we can sort based on their Driver Score
- Career Development Report
- ** We pretty much want to be able to sort/search based on any criteria that is available in the database as a field (and have it show up on one dashboard)

FIG. 5

SYSTEM AND METHOD FOR PRODUCTIVITY THINKING CODE LEVEL EVALUATION

CROSS-REFERENCE TO RELATED APPLICATION(S)

This application claims priority to and the benefit of U.S. Provisional Application No. 60/979,776, filed on Oct. 12, 2007, the entire contents of each of which is expressly incorporated by reference as if set forth in full herein.

BACKGROUND OF INVENTION

The qualitative method of Critical Incident Technique (CIT) that is now used both in quantitative and qualitative studies. It was developed by Flanagan (1954) when conducting extensive studies with the Aviation Psychological Program for the United States Army Air Forces to establish procedures for the selection and classification of aircrews (Callan, 1998).

In CIT, respondents are invited to describe a critical incident which has occurred to them in the particular area of research interest, and their observations are collected and applied to a problem solving exercise (Flanagan, 1954).

Each incident or "observable human activity that is sufficiently complete by itself to permit inference and predictions to be made about the person undertaking the activity" (Bitner et al., 1990:73) should have happened in an authentic situation (Flanagan, 1954).

Critics of qualitative research approaches, such as CIT, question the reliability and validity of the data collected in these studies. There is no doubt that qualitative methodologies involve interpretation by researchers (Strauss and Corbin, 1990). Researcher bias will emerge in coding, category development and interpretation. Anderson and Nilsson (1964), for example, report that the categorization phase of CIT is always contentious due to its subjectivity and complexity. In the face of such serious challenges, justifications of qualitative research methodologies vary widely. Some invoke philosophical arguments, highlighting the fact that, unlike quantitative researchers, who claim objectivity without giving a thought to the subjective bias in their very framing of research questions, qualitative researchers are at least honest in that they recognize that "the researcher is central to the sense that is made" (Banister, Burman, Parker, Taylor and Tindall, 1994, p. 2). Others, such as Anderson and Nilsson (1964), use quantitative tests to determine the reliability of data gathered. CIT has also been criticized for its failure to capture the range and frequency of 'similar' incidents. Such criticism betrays the bias toward quantitative research in business studies and fails to appreciate the uniquely rich and complex information which CIT yields, the distinctly individual tone which it captures, and the subtle emotional content which it reveals.

SUMMARY OF THE INVENTION

A system and method are provided for identifying ranges of scores in thinking areas that are indicative of individuals that perform at top levels. A position within an organization is identified. One or more individuals are identified as people that perform at a top level in that position. Each of the identified individuals is evaluated against a full time equivalent at the position. Each of the identified individuals is also scored in particular thinking areas. In some embodiments, the scores are based on the answers given by the identified individuals to a questionnaire. Characteristics of various workers are prioritized as to their desirability in a person performing the functions of the identified position. Based on the scores in particular thinking areas for the identified individuals, the full time equivalent evaluations for the identified individuals, and the prioritization of worker characteristics, a determination is made of ranges of scores in at least one of the thinking areas that are characteristic of persons who perform at top levels in the identified position.

In some embodiments, scores in the particular thinking areas are received or determined for a target individual. These scores are compared against the determined ranges of scores characteristic of persons who perform at top levels in the identified position and a composite expected performance rating is determined for the target individual for the identified position. In some embodiments, a plurality of target individuals are being considered to fill the identified position. A report is produced that lists the plurality of target individuals and the composite expected performance rating for each of them. In some embodiments, the target individuals submit answers to a questionnaire to a website, from which the scores in the particular thinking areas for that target individual are derived. A prospective employer for the identified position receives the report with the composite expected performance ratings on prospective hires for the identified position from the website.

BRIEF DESCRIPTION OF THE DRAWINGS

FIG. 5 is a virtual headhunter report according to an embodiment of the invention.

DETAILED DESCRIPTION OF THE INVENTION

Figure 1:
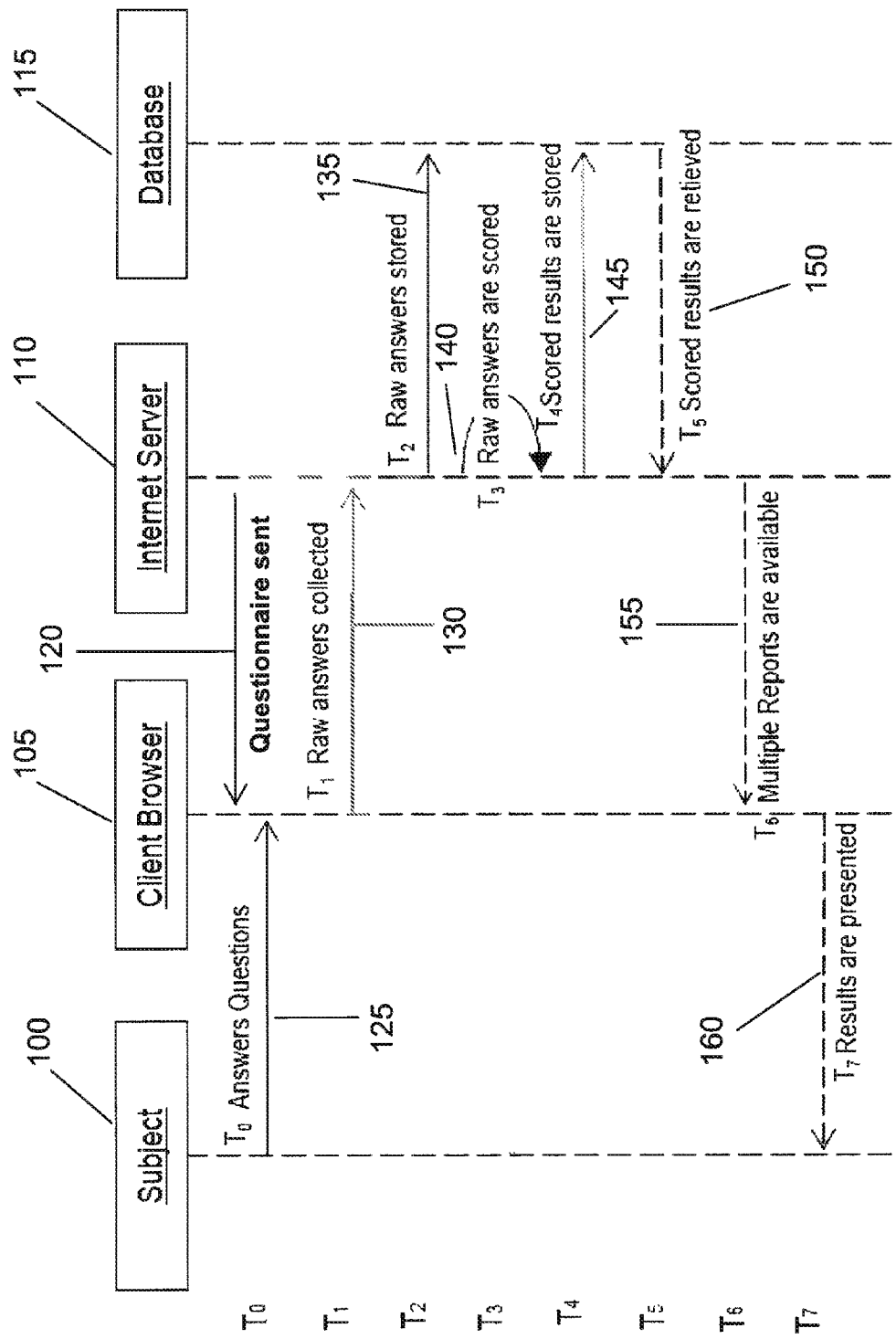
FIG. 1 is a flow chart showing the process of generating productivity thinking area scores for an individual according to an embodiment of the invention.

Behavioral research has been performed on the characteristics of members of an organization and the impact of these characteristics on the objectively measurable performance of the organization. In some cases, the organization is a business, the members are the business' personnel and the objectively measurable performance of the business is the business' financial performance.

Research has also been performed on mapping of the brain's thinking mechanism and how thinking mechanisms generate fears, pain, beliefs, anxiety, and task execution. This research led to identifying solutions to internal fears and pain reduction, resulting in changing peoples lives. However, current assessments of the members of an organization measure personality, styles, preferences, and social styles of the members. These assessments are not well linked to actual objectively measurable performance of the organization.

The thinking areas most highly correlated with high performance across all positions within an organization were isolated. These key productivity thinking areas (or "productivity thinking areas" or "thinking areas" for short) are 1) self-motivation, 2) stress or fear based motivation, and 3)

thinking speed. The "thinking code" mapping for productivity was outlined in each of these three productivity thinking areas.

This created the backend of the assessment system. A questionnaire was then developed, so a first run assessment was developed.

The assessment was used and improved in both a clinical setting, and in business applications including human development, hiring, staffing, succession planning, organizational development and business strategy.

To understand how the brain creates behaviors is like understanding how a computer program works in a computer. Each line of code is written to tell the computer what to present (visually) or what to do (tasks to perform). These commands create predictable results as defined by the code. Differences in the computer codes yield different results. The predictable results of some computer code are more desirable in some instances or for some objectives than others. Indeed, the predictable results of some computer code may be desirable in some instances or for some objectives and undesirable in other instances or for other objectives. Humans have a similar kind of code written in our subconscious minds that acts like the hard drive of a computer. This code written in our subconscious is our "human thinking code." Within this human thinking code are areas of thinking code that are specific to human productivity within an organization. These areas are called "productivity thinking areas," as they are the areas of the thinking code that are unique to the productivity of an individual in their position within an organization. The thinking mechanisms in these productivity thinking areas of individuals ("productivity thinking area mechanisms") have been found to be critically important in the maximum productivity of individuals within an organization, such as job duties, work behaviors, work outcomes, tasks, processes and procedures, and have been empirically demonstrated to be predicatively and significantly correlated with important elements of job performance.

Measuring the productivity thinking area mechanisms for an individual yields a set of productivity thinking values. Applying the productivity thinking values for an individual to a metric of productivity thinking values generates a productivity thinking profile for that individual—a well rounded, non-biased, objective assessment that reflects actual results that drive productivity. Templates of the desired productivity thinking profiles for various positions within various types of organizations in various industries or endeavors are created. Specific organizations use these templates or customized versions of these templates for each position in the organization.

Evaluation of productivity thinking area mechanisms is used for a broad range of human performance applications, such as developing productivity thinking templates that produce benchmark profiles that can be used for hiring members for an organization, evaluating and assessing the levels of productivity thinking area values of an organization, and other forms of evaluating how human productivity thinking mechanisms have an impact on the tasks of jobs and other human performance functions.

The productivity thinking questionnaire uniquely measures the thinking mechanisms in the key productivity thinking areas for an individual (subject) 100. The questionnaire is timed and includes a series of specialized questions. In some embodiments, the questionnaire included 126 questions. In other embodiments, the questionnaire includes more or less questions. In many embodiments, the questionnaire is presented to an individual via a web page or series of web pages. This web page or series of web pages is sent 120 to the individual's client browser 105 by a web server (or Internet server) 110. The individual answers 125 the questions on the questionnaire and enters the answers into the browser 105. The web server also keep track of the time an individual is taking to complete the questionnaire and stops allowing answers after a predetermined amount of time after the web server begins presenting the questionnaire to the individual. The web server collects 130 the raw answers given by the individual and stores 135 them and their association with the individual that supplied them to the web server in a database 115.

The raw scores are then scored (normalized) 140 using a specialized normative data table. This process results in normalized scores for most of twelve performance thinking areas (discussed in more detail below) for the individual. In many embodiments, scores for the anxiety and drive level thinking areas are determined separately. These normalized and other calculated scores are also stored 145 in the database, associated with the individual.

In many embodiments, the normative data table is developed by evaluating the answers given for the questionnaire by a statistically random set of individuals that represent the general population of individuals that hold positions in an organization. In other embodiments, the normative data table is developed by evaluating the answers given for the questionnaire by a statistically random set of individuals that represent an entire general population. In many embodiments, these normative data tables convert the raw scores into percentile ranks for each of the normalized performance thinking areas, resulting in scores in the range of zero to ninety-nine or one to one hundred, depending on the particular implementation.

In other embodiments, a number of specialized normative data tables, each tailored for a particular job function or role within an organization are used. For example, a raw score in a particular thinking area of an 8 may be normalized to a 40 using a specialized normative data table for CIOs, while the same raw score may be normalized to a 75 using a specialized normative data table for general sales staff. The same raw score in another thinking area may result in a higher normalized score using a CIO data table than if a general sales staff data table is used. In other embodiments, the normative tables will be specialized even further for a particular organization, or created for a particular position within that organization. In many of these embodiments, the normalized data tables are created by collecting sample data regarding the levels of performance thinking in a variety of areas, including the twelve areas in the normative data tables, of a number of individuals that hold the same or similar position or perform the same or similar function within an organization. The sample data for these individuals is analyzed against the actual performance ratings of the same individuals by their supervisors. For example, a performance thinking area is weighted more if individuals that are subjectively rated as high performers by their supervisors share similar scores in that thinking area that are higher than the scores of low performers in that thinking area. Conversely, for example, a thinking area is weighted less if individuals that are subjectively rated as high performers have widely varying scores in that thinking area or scores that are similar to the scores of low performers in that thinking area. In other cases, a thinking are may be inversely (i.e., negatively) weighted if it is found that individuals that are subjectively rated as low performers by their supervisors share similar scores in that thinking area that are higher than the scores of high performers in that thinking area. In yet other cases, a thinking are may be variably weighted in situations where, for example, as long as scores are within a certain range in a particular thinking, there is little or no correlation between where the scores are within that range and whether the individual is a highly rated performer or an average rated performer, but when the score in this thinking area is outside of this range, or is in another range, there is a high correlation with the individual being a lower rated performer by their supervisor.

In some embodiments, the same normative date tables are used for every individual being evaluated, regardless of the position or, in some cases, the organization. These embodiments still can use custom templates for specific positions and/or organizations. In these embodiments, the templates take the form of customized ranges of performance levels based on a particular position and/or organization. Thus, returning to the example of a raw score of 8 in a particular thinking area, it may be normalized to a 55 using a general population normative table. However, for a CIO, a customized range for this thinking area may be 45-80, meaning that for an individual that is being evaluated as a CIO, their score in this thinking area will be interpreted based on where it is within the 45-80 range, and in the case of a score of 55, the individual would be considered below average for a CIO in this thinking area. At the same time, however, for a member of the general sales staff, a customized range for this thinking area may be 20-70, in which case the individual would be considered fairly well above average in this thinking area for a member of the general sales staff.

In other embodiments, a combination of customized normative tables and customized ranges of performance levels is used.

In many embodiments, additional questions or statements are formulated that are customized for a particular position or a specific subset of the questions or statements in the general thinking area evaluation questionnaire are identified as being of particular relevance to the performance level in a particular position. These questions or statements may also be used to prioritize the productivity thinking areas or the inclusions of particular questions or statements in a customized questionnaire may depend on the prioritization given to certain thinking areas by supervisors, as discussed in more detail below.

As discussed above, there are three general thinking areas: 1) self-motivation, 2) stress or fear based motivation, and 3) thinking speed. The self-motivation thinking area can further be split into five more specific thinking areas: 1) ambition, 2) confidence, 3) interpersonal, 4) relational, and 5) systematic. The stress or fear based motivation area can also be split into five more specific areas: 1) need for reassurance, 2) controlling, 3) skeptical, 4) self-defeat, and 5) self-conscious. The stress or fear based motivation area also includes a sixth specific area, but this area in not derived from a direct measurement, but from analysis of the results of the five self-motivation areas and the five measured stress or fear based motivation areas. This sixth specific area is anxiety level, and it is a measure of internal friction causing internal stress and/or pressure due to counterproductive thoughts in the self-motivation and stress or fear based thinking areas firing off simultaneously. In many embodiments, the anxiety thinking area is also scored on the same scale, (1-100, for example) as the other self-motivation and stress or fear based thinking areas. Also, in many embodiments, the drive level is measured on a different, non-normalized scale such that two drive level scores indicate the relative drive level of two individuals rather then their relative rank of drive level within a population. In many embodiments, if the raw drive level score is not already on a scale of one to thirty-two, for example, a constant multiple of the raw drive level score is used to convert raw drive level scores to final drive level scores in the range of, for example, one to thirty-two.

Once the individual's scores are stored in the database, they may be used in various reporting options. In many embodiments, these reports are accessed through a web server. While in FIG. 1, a single web server 110 is shown, in some embodiments, more than one web server is used. In various of these embodiments, the functions of web server 110 discussed herein are split between different web servers and/or different web servers share one or more of these functions with other web servers. In some embodiments, different web servers may be used for different organizations. In any of these embodiments, a single web server may serve multiple independent web sites, each according to an embodiment of the present invention.

In some embodiments, reports based on an individual's scores are made available to the individual while in some embodiments, reports based on an individual's scores are made available to a third party, such as authorized personnel of an organization. In many embodiments, reports based on an individual's scores are made available to both the individual and authorized personnel of an organization. However, in many of these embodiments, some or all of the reports available to the individual will not be available to authorized personnel of an organization and vice versa.

Taking the example of an authorized person within an organization, the subject 100 will be the authorized person within an organization rather than the individual that supplied the answers to the questionnaire. In this case, it is highly likely that client browser 105 will be located on another computer than the client browser used by the individual that supplied the answers to the questionnaire, while perhaps using the same browser client software. In any case, web server 110 generates a web page indicating what reports are available 155 and sends this web page to the client browser 105. The web server 110 retrieves 150 the scored results from the database 115, either before or after the web server receives a request for a report from the person operating the client browser. Once the web server has received a request for a report from the client browser and the scores from the database, the web server generates a report and sends it to the client browser which presents 160 the results to the person using the client browser.

Figure 2:
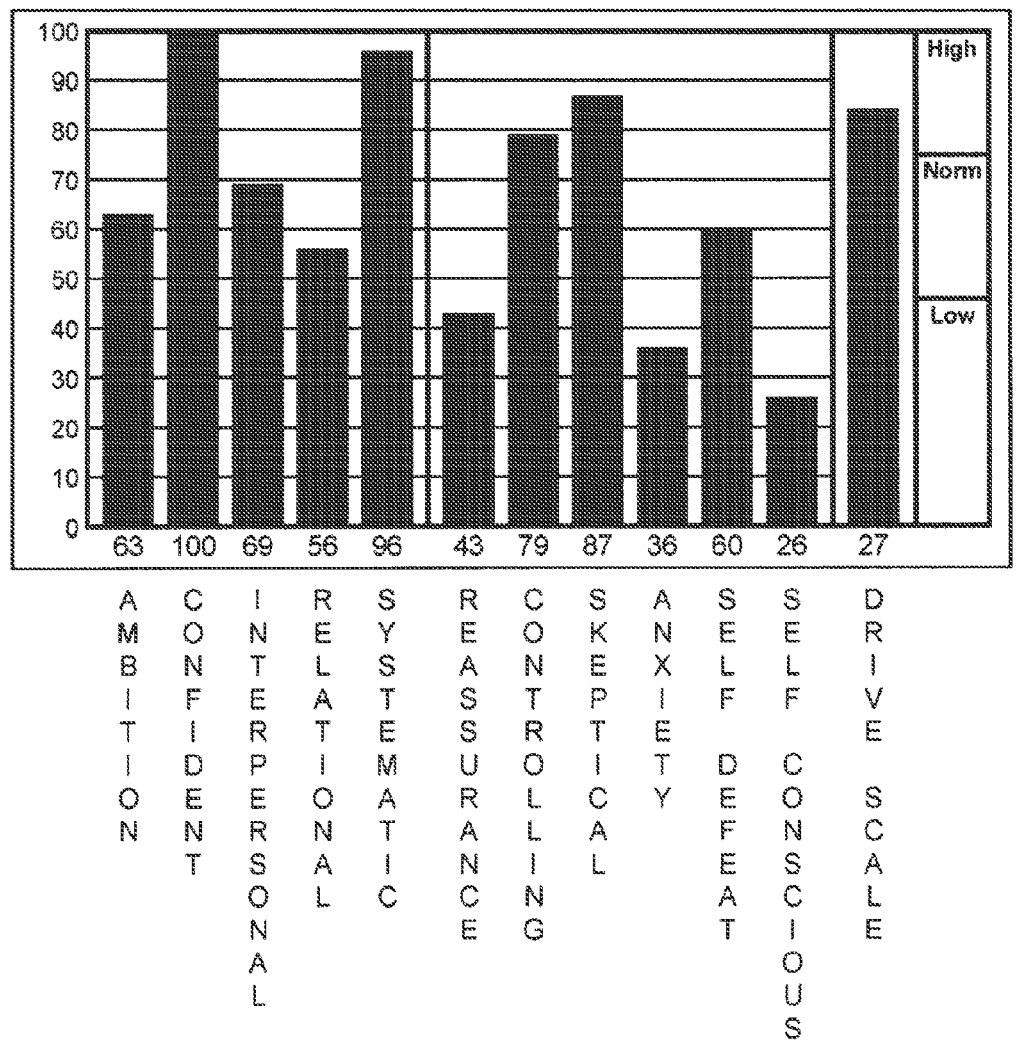
FIG. 2 is an example of a report showing the productivity thinking area scores for an individual according to an embodiment of the invention.

In some embodiments, among the reports available are a standard text report, a report that graphically shows the levels scored in each of the twelve specific thinking areas (5 self-motivation areas, 6 stress or fear based area (including anxiety), and thinking speed (also referred to as drive scale)), a report on how a subject operates in daily situations, a report on how a subject reacts under stress or pressure, custom interview questions, and a leadership, career and personal development report. As discussed above, some of these reports, such as a leadership, career and personal development report, are targeted at the individual that supplied the answers to the questionnaire while other reports, such as custom interview questions, are targeted at authorized personnel of an organization. An example of a report that graphically shows the levels scored in each of the twelve specific thinking areas is shown in FIG. 2.

In many embodiments, the system performs additional calculations on the normalized scores for an individual to determine an overall performance quotient. In many embodiments, the methodology and specific calculations used to determine the overall performance quotient will be the same for all subjects and all positions and functions within an organization. In some other embodiments, either the methodology or specific calculations used to determine the overall performance quotient for a particular subject are customized for a particular organization or group or type of organization, customized for a particular position, job function, or group or type of position or job function, or any combination of such customizations. The process involved in customizing the methodologies and calculations for specific organizations and/or positions is similar to process for generating custom or more specific normative data tables discussed above. In most situations, however, using custom or specialized normative data tables to generate the scored levels for the specific productivity thinking areas achieves a similar desired level of specificity of the overall performance quotient as using a single normative data table and using custom methodologies and calculations for the overall performance quotient. On the other hand, using custom or specialized normative data tables may require separate sets of normalized scores for the twelve specific productivity thinking areas to be used for the same individual for different positions and/or organizations. In some embodiments, customized normative data tables are used for different positions within an organization while customized methodologies or calculations are used to tailor results for a particular organization, or vice versa.

In many embodiments, supervisor identification of top performers from the pool of individuals they supervisor is used as one of the bases for identifying the productivity thinking areas levels that are characteristic of these top performers in a particular role or job. For example, a supervisor that supervises ten sales people is asked to identify their two top sales people and rate them on a scale of 1 to 100 percent, 100 percent indicating a hypothetical person that produces as much as is reasonably possible to the organizations overall success (e.g., sales amount minus costs for a sales person) for a person in their position. Thus, a supervisor may identify Mr. Smith and Ms. Jones as their two highest (top) performers. The supervisor may then give Mr. Smith an overall rating of 85% productivity and Ms. Jones an overall productivity rating of 90%. The system then correlates the actual productivity thinking area scores for Mr. Smith and Ms. Jones to the overall productivity ratings given by their supervisor. Such analysis will not only identify productivity thinking areas in which the top performers share similar levels, but also indicate some baselines for particular levels or ranges of levels of particular productivity thinking areas that are tied to high performance in the position.

In many embodiments, besides identifying the top performers that work for a supervisor, the supervisor is also given a list of job competencies from which to identify the particular competencies that the supervisor considers most advantageous for the particular job or role the supervisor is analyzing. In one embodiment, the following job competencies are given to supervisor: Enthusiastic, Take charge, Self-starter, Achiever—strong initiative, Good Decision Maker, Optimistic, Positive attitude, Responsible Leadership, Energetic, Realistic, Independent, Confident and at ease, Friendly, Personable, Communicates with Ease, Joins in groups well, Very Expressive, Easily expresses self, Complimentary, Understanding nature, Perceptive, Respects others, Compassionate, Forgiving, Good task focus, Accurate, Organized, Can mentally do job, Planner, Job done in timely fashion, Non-assertive, Trusting, Doesn't look for approval, Not afraid to speak up, Likes responsibility, Self-assured, Non-argumentative, Open to others ideas, Not critical of others, Has to be right all the time, Sale closer, Very aggressive nature, Not opposed to others suggestions, Non-complaining, Doesn't like being told what to do, Suspicious thinker, Self-screens work, Non-oppositional, Forward thinking attitude, Comfortable taking risks, Risk taker—doesn't fear failing, Not easily overwhelmed, Has a never give up attitude, Not critical of self, Rational thinker, Doesn't over personalize, Doesn't take others problems personally, Has sound judgment, Gets Along With Others, and Action-Oriented. In this embodiment, these sixty job competencies are in groups of six, each group corresponding to one of the twelve productivity thinking areas except anxiety and drive. In other embodiments, more or less job competencies make up the list provided to the supervisor. In some embodiments, the grouping and order of the job competencies does not follow the productivity thinking areas.

In many embodiments, the supervisor is requested to pick ten of the sixty job competencies as being primary the job competencies that the supervisor seeks in a person for a particular job. The supervisor is also asked to pick ten other job competencies that are secondary competencies that lead to high performance in the particular job. In other embodiments, the supervisors choose more or less than ten primary and secondary job competencies. In some embodiments, only primary job competencies are used while in some embodiments, tertiary or farther levels of job competencies are ranked by supervisors. The job competency ratings are used by the system, as described below, to determine which productivity thinking areas should be emphasized and how much weight should be given to different productivity thinking areas when an individual's productivity thinking area scores are compared to a template of the productivity thinking area ranges that are likely to produce top performers at a certain position.

In many embodiments, position customized templates are further enhanced by mapping various performance levels to the performance of a full time equivalent (for example, salary, benefits, hourly wage, sales performance) of a worker in this position. In many embodiments, the individuals selected by their supervisor as top performers, the percentage score given to those top performers by their supervisor, and the actual productivity thinking area scores of the top performers are used in determining the ranges of the productivity thinking areas that are indicative of a full time performer at the position. For example, if a 90% rated top performer has an actual productivity thinking area score of 72 in a particular thinking area, that score correlates to a productivity thinking area score of 81 for a (100%) full time equivalent. If a second 80% rated top performer has an actual productivity thinking area score of 68 in the same particular thinking area, that score correlates to a productivity thinking area score of 85 for a full time equivalent. In this example, the two calculated thinking area score of 81 and 85 are used in setting minimum and maximum ends of a range of productivity thinking area scores that are indicative of a top performer for that position.

In other embodiments, the full time equivalent standard used by a particular organization may be based on the performance level of an average worker in the position at that organization, or may be based on a desired average performance level of workers in the position rather than a top performer in the position. In many of these embodiments, the mappings are created based on the input of supervisors that rate how many of a particular worker would it take to be equivalent to a hypothetical typical full time employee in that position. Thus, a supervisor may determine that individual A produced 75% of the production of the "typical" performer in that position, individual B produced 90% of the production of the "typical" performer and individual C produced 140% of the production of the "typical" performer. This data is compared with the performance thinking area scores of these individuals to identify correlations between particular thinking areas and/or area scores that reflect the desired priority productivity thinking areas, and perhaps overall performance quotients to arrive at mappings of the performance thinking levels of individuals to full time equivalents for a particular position.

In some embodiments, the performance thinking levels of individuals within an organization are compared with hard financial information that can be associated with those individuals. Taking a member of the general sales staff as an example, besides the subjective evaluation of a supervisor, individuals' financial sales performance is compared to their performance thinking levels and correlations between actual sales generation and performance thinking levels are identified. In other embodiments, a combination of the evaluations of the general population of workers and the evaluation of the top performers at a particular position are used.

Figure 3:
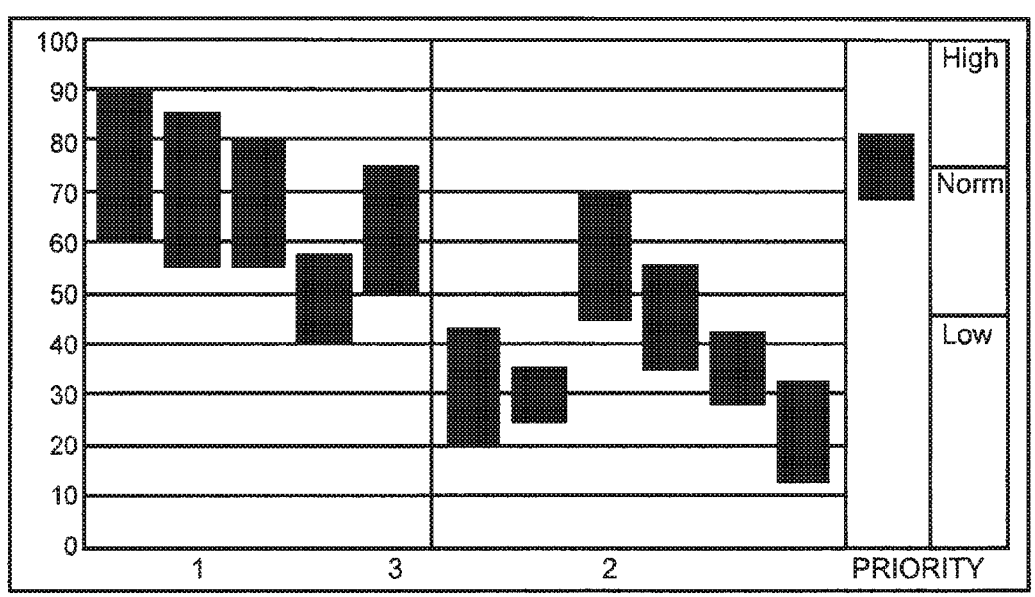
FIG. 3 is a top performer template report according to an embodiment of the invention.

FIG. 3 shows a report that combines the information from top performer evaluations of supervisors, the productivity thinking area scores for the individuals identified as top performers, the job competencies supervisors think are important for certain positions, and full time equivalent data. This data is combined to produce ranges for each productivity thinking area that are characteristic for top performers in a particular position, who are also those individuals that are the most profitable in monetary terms. In some embodiments, the report also includes indicators that show the prioritizations of one, some, or all of the thinking areas as they apply to the particular position.

Figure 4:
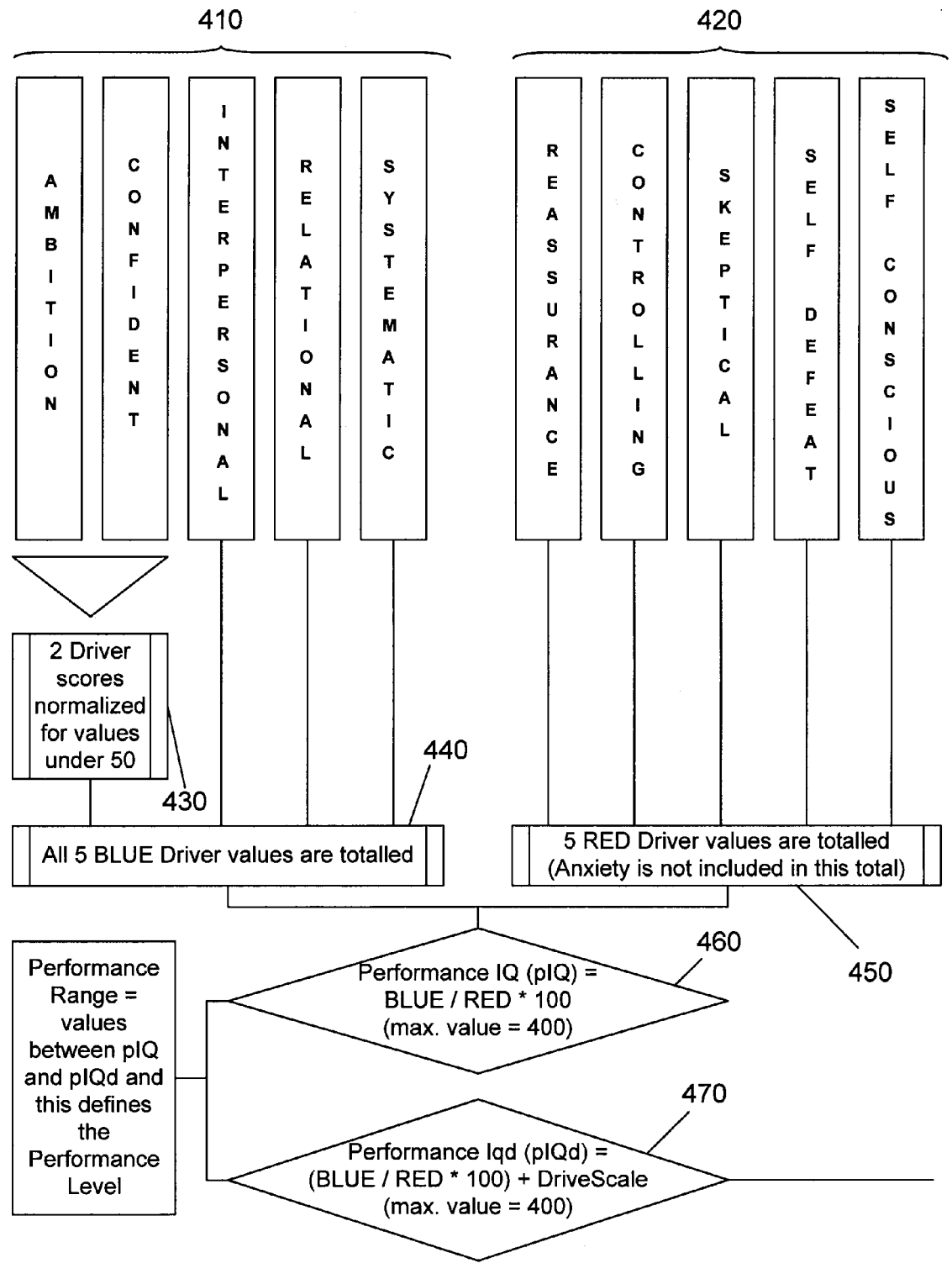
FIG. 4 is a flow chart showing the process of generating a performance quotient according to an embodiment of the invention.

FIG. 4 shows a flow chart of the methodology in determining an overall performance quotient according to many embodiments of the invention. The methodology begins with the scores for the five specific self-motivation thinking areas (ambition, confidence, interpersonal, relational, and systematic) 410 and the scores for the five specific stress or fear motivation thinking areas (need for reassurance, controlling, skeptical, self-defeat, and self-conscious) 420 that are directly derived from questionnaire answers. The anxiety thinking area score is not used in determining the overall performance quotient because it is already derived from the other ten scores used as the basis of the overall performance quotient and thus use of the anxiety score would likely result in the double of the significance of the particular aspects of the specific thinking areas used in calculating the anxiety score. Scores in the ten areas that are under 50 are further normalized. The reason for this is that low scores (i.e., scores below 50) in the self-motivation thinking areas actually indicate deficiencies in these positive productivity areas compared with the sample population while low scores in the fear or stress thinking areas indicated low levels in a negative productivity area that would increase overall productivity. In some embodiments, the normalization of scores below 50 are reduced further 430, by functions involving, for example, variable, constant, and/or stepped reductions or by using matrices of values or reduction functions. In these embodiments, this further normalization gives more weight to low scores in a thinking area than high scores in a thinking area. In other embodiments, normalizations of scores above 50 are performed. If these normalizations increase these scores, this would give more weight to high scores in a thinking area than low scores in a thinking area. In various embodiments, combinations of special normalizations may be used to emphasize or deemphasize scores within certain ranges (e.g., high, low, middle, high and low, etc.) of all or just some of the thinking areas.

After any scores are renormalized, scores for the five self-motivation thinking areas 410 and the five specific stress or fear motivation thinking areas 420 are totaled separately 440, 450. The ratio of self-motivation thinking areas score total to the stress or fear motivation thinking areas is taken 460. This ratio is then multiplied by 100 and values over 400 are reset to 400. This result is the base overall performance quotient. A second, enhanced overall performance quotient also includes a thinking speed aspect 470. The enhanced overall performance quotient is determined by adding the normalized thinking speed area score (e.g., 1-32) to the base overall performance quotient, again resetting values over 400 to 400.

The significance of a particular enhanced overall performance quotient is shown in Table 1, below, in terms of overall productivity thinking level. As seen in the table, in many embodiments, the correlation between enhanced overall performance quotients and the overall productivity thinking level is not linear.

TABLE 1

| | |
|---|---|
| LEVEL 5<br>Mastery<br>Performance<br>Quotient<br>251-400<br>GREEN ZONE | Performance potential is optimal. People in this category have self motivator thinking areas that greatly outweigh their stress motivator thinking areas. There is very little in the way of barriers; things that can interfere or impede job performance. If obstacles or barriers evolve, these individuals are looking for solutions quickly and take immediate action for a profitable result. "Born problem solvers" describes them. Top performance is expected and generally yielded in this category. These individuals are often strategic in their high level thinking. They have high self standards for exceptional and unsurpassed mastery and leadership.<br>PROFIT CHANGING PERFORMANCE |
| | They have high self standards for exceptional and unsurpassed mastery and leadership. |
| LEVEL 4<br>Distinctive<br>Performance<br>Quotient<br>126-250<br>GREEN ZONE | Performance potential is considerably higher than average to the point of unique and outstanding. People in this category generally find it easier to execute job performance and are less affected by outside distractions. People in this category generally are prominently equipped to execute job performance at exemplary levels provided they have the right job fit - meaning they are in a job that best meets their skills, knowledge and experience. Clearly, excellence in performance is expected in this category. If a job fit is not perfect, development to a new skill set comes easily. High potential candidates for succession planning in organizations.<br>HIGH POTENTIAL - PRODUCTIVITY PERFORMANCE |
| | There may be one or two productivity thinking areas that need improvement for them to advance to Level 5. |

TABLE 1-continued

| | |
|---|---|
| LEVEL 3<br>Transitional<br>Performance<br>Quotient<br>81-125 | Performance output may be elevated. They may show stronger interest in increasing their career path development. People in this category have the capacity to work at consistent performance levels, but may not have developed all their productivity thinking areas to full potential. Positions that cater to a worker's productivity thinking area strengths should yield higher productivity and performance output. They may be good candidates for mentoring or succession planning tracks. There may be several critical productivity thinking area levels that need improvement for them to advance to Level 4. |
| LEVEL 2<br>Conventional<br>Performance<br>Quotient<br>51-80 | Performance potential is average to high. People in this category generally can meet expectations however distractions may play into the picture. They may lack the productivity thinking area capacity for positions that are multi-area intensive. For positions that are linear or less thinking area intensive, top performance can be achieved with applied effort or targeted productivity thinking area development. These individuals can be good candidates for development in their career path. There may be key critical productivity thinking area levels missing that need improvement for them to advance to Level 3. |
| LEVEL 1<br>Nominal<br>Performance<br>Quotient<br>0-50 | People in this category generally are at a Novice or Apprentice level and may have high stress levels that are holding them back. They can experience considerable difficulty when outside pressures cause them to freeze up or become incapacitated due to internal fears. They may look for low level or stress free positions. People in this category may have fluctuating mood swings, are prone to counterproductive "fear feeling" controlling their life. They may not want jobs with supervisor responsibility. Yet they may function well at lower level positions. Generally requires increased productivity thinking area development to get them to Level 2. |

Levels in each of the productivity thinking areas are not fixed for any particular individual. Exercises and training can be done that increases levels in the self-motivation thinking areas and/or decreases levels in the stress or fear motivation thinking areas. As an individual's overall performance quotient increases from 1 to 5, the individual's performance capability is more refined, thus the performance predictability increases.

Using the full time equivalents and individually associated financial results, an organization then can thus correlate specific financial performance with performance thinking levels. With this knowledge, organization can then determine the likely financial effects of raising or lowering the performance thinking levels of particular groups of individuals. Raising performance thinking levels is usually achieved through training of existing employees or hiring new employees with higher performance thinking levels. With either of these techniques, the anticipated costs involved in training or new hires can be compared with the expected increase in financial performance and training and hiring plans are made accordingly. On the other hand, lowering the performance levels of a particular groups of individuals (for example, it is found that the difference in pay between higher performance levels and lower performance level individuals holding the same position is significantly greater than the financial productivity between higher performance levels and lower performance level individuals) is usually achieve through attrition of the higher performance level, but higher paid individuals and replacement by lower performance level individuals or reducing the pay of the higher performance level individuals.

In these embodiments, the financial performance of workers with various productivity thinking area levels can be compared to the cost to the organization of employing these workers. In doing so, information is derived that identifies the ranges for each of the productivity thinking areas that are characteristic of workers whose performance is greater than their employment costs—in other words, profitable. Of course, these ranges are usually different for different positions, based on the information in the performance templates for the positions. Returning to FIG. 4, included are columns for each of the twelve productivity thinking areas and a range within the normalized scale of 0 to 100 for each thinking area that indicates what levels are characteristic of profitable people holding the position that is the subject of the report. Generally, individuals whose productivity thinking area scores are below the ranges on the report will not have lower financial equivalent performance compared to the expense of employing them and will be unprofitable. Conversely, individuals whose productivity thinking area scores are above the ranges on the report may command high compensation because of their higher thinking skill levels, but in the particular position, these higher thinking levels are not fully utilized and result in lesser increased financial equivalent performance than the increased compensation that must be given to such individuals. So, the ideal situation is to find individuals whose productivity thinking area scores are within or closest to the ranges on the report.

In many embodiments, each of various results of analysis of performance thinking areas of individuals is used in the hiring process in addition to or in place of the evaluation of individuals already in the organization. In these embodiments, in addition to receiving the typical past employment and education history of job applicants, each job applicant is given a productivity thinking questionnaire. The answers of an individual to the questionnaire are scored, normalized and evaluated as described above. Once evaluated using any one or combination of techniques describe above, the results of the evaluation are included in a report on the candidates applying for a particular position. One such report 500 is shown in FIG. 5. The report in FIG. 5 lists six candidates 510 for the position, "Outside Sales—Regional Rep" 520. Further, when multiple candidates are being evaluated in this manner, as shown in FIG. 5, in preferred embodiments the candidates are ranked according to their overall evaluation 530 for the particular position or template. Thus, the candidates are ranked against one another's scores and placed in priority on a dashboard so recruiters and headhunters can view top candidates that have been pre-sorted top down in performance thinking. In this way, candidates are sourced by their productivity thinking which links back to financial performance for maximum productivity.

In addition to traditional contact information for the candidates, the report includes links to more detailed thinking performance reports 540 that may include reports such as the reports shown in FIG. 2 or 3 that show the scores for an individual in each of the 12 specific performance thinking areas and how they relate to the needs of the position. In some embodiments, the report also includes links to customized interview questions 550 based on the evaluation of the individual's answers to the productivity thinking questionnaire that may allow for more precise evaluation of the individual's performance thinking areas or probe potential areas of concern identified based on answers to the productivity thinking questionnaire.

While certain exemplary embodiments have been described in detail and shown in the accompanying drawings, it is to be understood that such embodiments are merely illustrative of, and not restrictive of the broad invention. It will thus be recognized that various modifications may be made to the illustrated and other embodiments of the invention described above, without departing from the broad inventive scope thereof. In view of the above, it will be understood that the invention is not limited to the particular embodiments or arrangements disclosed, but is rather intended to cover any changes, adaptations or modifications which are within the scope and spirit of the invention and equivalents thereof.

What is claimed is:

1. A system for identifying ranges of scores in thinking areas that are indicative of individuals that perform at top levels comprising:
    a computer that receives identification of one or more individuals as persons that perform at top levels in an identified position and a ratio of an individual's performance to the performance of a hypothetical person performing in the identified position at a predetermined level for each of the identified individuals;
    the computer configured to:
        determine scores in particular thinking areas that are indicative of individuals that perform at top levels for each of the identified individuals;
        receive prioritizations of at least some of a plurality of worker characteristics according to the relation between the worker characteristic and characteristics desirable in a person performing the functions of the identified position; and
        from the scores of the identified individuals in particular thinking areas, the performance ratios for the identified individuals, and the prioritization of worker characteristics for the identified position, determine ranges of scores in at least one of the thinking areas that are characteristic of persons who perform at top levels in the identified position.

2. The system of claim 1 wherein the particular thinking areas include self-motivation thinking areas, fear based thinking areas, and thinking speed.

3. The system of claim 2 wherein:
    the self-motivation thinking areas include ambition, confidence, interpersonal, relational, and systematic; and
    the fear based thinking areas include need for reassurance, controlling, skeptical, self-defeat, self-conscious, and anxiety.

4. The system of claim 1 wherein at least some of the plurality of worker characteristics are correlated with one or more of the thinking areas.

5. The system of claim 1 wherein the computer configuration to determine scores in particular thinking areas for each of the identified individuals comprise a configuration to receive scores in the particular thinking areas for each of the identified individuals.

6. The system of claim 1 wherein the computer is further configured to:
    receive scores in the particular thinking areas for a target individual;
    compare the scores in the particular thinking areas for the target individual against the determined ranges of scores characteristic of persons who perform at top levels in the identified position and determine a composite expected performance rating for the target individual for the identified position.

7. The system of claim 6 wherein the composite expected performance rating comprises a number from 0 to 400.

8. The system of claim 6 wherein the computer is further configured to determine a composite expected performance level for the target individual based on which of a limited number of predetermined ranges of composite expected performance scores include the composite expected performance score determined for the target individual.

9. The system of claim 6 wherein the computer is further configured to:
    identify a plurality of target individuals being considered to fill the identified position;
    produce a report that includes a representation corresponding to at least one of the plurality of target individuals and, for each representation, an indication correlated to the composite expected performance rating for the target individual correlated to such representation.

10. The system of claim 9 wherein the report is provided through a web server.

11. A method of identifying ranges of scores in thinking areas that are indicative of individuals that perform at top levels comprising:
    a computer receiving identification of one or more individuals as persons that perform at top levels in an identified position;
    the computer receiving a ratio of an individual's performance to the performance of a hypothetical person performing in the identified position at a predetermined level for each of the identified individuals;
    the computer determining scores in particular thinking areas that are indicative of individuals that perform at top levels for each of the identified individuals;
    the computer receiving prioritizations of at least some of a plurality of worker characteristics according to the relation between the worker characteristic and characteristics desirable in a person performing the functions of the identified position; and
    from the scores of the identified individuals in particular thinking areas, the performance ratios for the identified individuals, and the prioritization of worker characteristics for the identified position, determining, by the computer, ranges of scores in at least one of the thinking areas that are characteristic of persons who perform at top levels in the identified position.

12. The method of claim 11 wherein the particular thinking areas include self-motivation thinking areas, fear based thinking areas, and thinking speed.

13. The method of claim 12 wherein:
    the self-motivation thinking areas include ambition, confidence, interpersonal, relational, and systematic; and
    the fear based thinking areas include need for reassurance, controlling, skeptical, self-defeat, self-conscious, and anxiety.

14. The method of claim 11 wherein at least some of the plurality of worker characteristics are correlated with one or more of the thinking areas.

15. The method of claim 11 wherein the computer determining scores in particular thinking areas for each of the identified individuals comprises the computer receiving scores in the particular thinking areas for each of the identified individuals.

16. The method of claim 11 further comprising:

the computer receiving scores in the particular thinking areas for a target individual;

the computer comparing the scores in the particular thinking areas for the target individual against the determined ranges of scores characteristic of persons who perform at top levels in the identified position and determining a composite expected performance rating for the target individual for the identified position.

17. The method of claim 16 wherein the composite expected performance rating comprises a number from 0 to 400.

18. The method of claim 16 further comprising the computer determining a composite expected performance level for the target individual based on which of a limited number of predetermined ranges of composite expected performance scores include the composite expected performance score determined for the target individual.

19. The method of claim 16 further comprising:

identifying, to the computer, a plurality of target individuals being considered to fill the identified position;

the computer producing a report that includes a representation corresponding to at least one of the plurality of target individuals and, for each representation, an indication correlated to the composite expected performance rating for the target individual correlated to such representation.

20. The method of claim 19 wherein the report is provided through a web server.

* * * * *